United States Patent
Yu et al.

(10) Patent No.: US 12,389,835 B1
(45) Date of Patent: Aug. 19, 2025

(54) PRECISION SOWING DEVICE FOR RICE POT SEEDLING RAISING

(71) Applicant: Zhejiang Academy of Agricultural Sciences, Hangzhou (CN)

(72) Inventors: Guohong Yu, Hangzhou (CN); Xianglei Xue, Hangzhou (CN); Ning Ren, Hangzhou (CN); Hang Zheng, Hangzhou (CN); Yunxiang Ye, Hangzhou (CN); Shuai Shen, Hangzhou (CN)

(73) Assignee: Zhejiang Academy of Agricultural Sciences, Hangzhou (CN)

( * ) Notice: Subject to any disclaimer, the term of this patent is extended or adjusted under 35 U.S.C. 154(b) by 0 days.

(21) Appl. No.: 18/929,961

(22) Filed: Oct. 29, 2024

(30) Foreign Application Priority Data

Feb. 18, 2024 (CN) .......................... 202410179669.5

(51) Int. Cl.
*A01G 9/08* (2006.01)

(52) U.S. Cl.
CPC .................................... *A01G 9/085* (2013.01)

(58) Field of Classification Search
CPC .................................................... A01G 9/085
See application file for complete search history.

(56) References Cited

U.S. PATENT DOCUMENTS

| | | | | |
|---|---|---|---|---|
| 3,627,173 A * | 12/1971 | Kerker | ................... | A01G 9/085 221/211 |
| 4,718,363 A * | 1/1988 | Williames | .............. | A01C 7/044 111/91 |
| 2019/0183066 A1* | 6/2019 | Conrad | ................... | A01C 7/105 |
| 2021/0195829 A1* | 7/2021 | Crews | .................... | A01C 7/044 |
| 2022/0061207 A1* | 3/2022 | Visser | .................... | A01C 7/042 |

FOREIGN PATENT DOCUMENTS

CN          215223021 U          12/2021

OTHER PUBLICATIONS

Translation of CN 110301269 A (Year: 2019).*

* cited by examiner

*Primary Examiner* — Monica L Perry
*Assistant Examiner* — Brittany A Lowery
(74) *Attorney, Agent, or Firm* — Ryan T. Grace; Advent, LLP

(57) ABSTRACT

Provided is a precision sowing device for rice pot seedling raising. The device includes a rack, a seed storage mechanism, a seed suction mechanism, and a driving mechanism. The seed suction mechanism includes a seed suction cylinder, and a circulation assembly. The sowing mechanism includes a sowing cylinder rotatably arranged on the rack, and multiple sowing troughs corresponding to multiple suction nozzles one by one are arranged on an outer wall of the sowing cylinder. The driving mechanism is used to drive the seed suction cylinder and the sowing cylinder to rotate in the same direction clockwise or counterclockwise around axes thereof, such that the suction nozzle and the sowing trough are opposite to each other and have opposite movement trends, and seeds on the suction nozzle can be scraped into the sowing trough by an inner wall of the sowing trough.

10 Claims, 4 Drawing Sheets

PRECISION SOWING DEVICE FOR RICE POT SEEDLING RAISING

CROSS-REFERENCE TO RELATED APPLICATION

This patent application claims the benefit and priority of Chinese Patent Application No. 2024101796695, filed with the China National Intellectual Property Administration on Feb. 18, 2024, the disclosure of which is incorporated by reference herein in its entirety as part of the present application.

TECHNICAL FIELD

The present disclosure relates to the technical field of pot seedling sowing equipment, and in particular to a precision sowing device for rice pot seedling raising.

BACKGROUND

Compared with conventional rice blanket seedlings, rice transplanting with pot seedling machine has the advantages of light damage, short weak period, early and quick tillering, gentle population tiller reduction, high seed setting rate, and high thousand-grain weight. The number of grains per panicle and the number of spikelets in population are increased significantly, and the rice yield can be effectively improved.

In order to avoid waste of seeds, precision sowing is an important link in hybrid rice pot seedling raising, and two to three seeds need to be sown in each hole. At present, suction nozzles are usually used for sowing, such as a precision rice sowing and seedling raising production device provided in Patent CN215223021U. During seed suction, a seed suction box provides a negative pressure by a fan, and adsorbs seeds by a suction nozzle. During sowing, the seed suction box provides a positive pressure through the fan and sows the seeds through the suction nozzle. However, as the hybrid rice seeds have many rice awns, the suction nozzle is easy to be locked, and the rice awns are easy to be sucked into the seed suction box, which are inconvenient to discharge and affect the use of the seed suction box. Moreover, seed suction and sowing need to switch a working state of the fan to provide the negative pressure or positive pressure, leading to inconvenient use, affecting the sowing efficiency.

SUMMARY

An objective of the present disclosure is to provide a precision sowing device for rice pot seedling raising to solve the problems in the prior art. Through the precision sowing device, the rice awns can be discharged in time to avoid blockage, and the sowing efficiency can be improved.

To achieve the objective above, the present disclosure employs the following schemes:

A precision sowing device for rice pot seedling raising includes a rack, a seed storage mechanism, a seed suction mechanism, and a driving mechanism. The rack is used to be arranged above a transmission device. The seed storage mechanism is fixedly arranged on the rack, and provided with a seed storage trough. The seed suction mechanism includes a seed suction cylinder, and a circulation assembly. The seed suction cylinder is rotatably connected to the rack, and provided with multiple suction nozzles communicating with the inside. The circulation assembly runs through the seed suction cylinder in an axial direction and communicates with each suction nozzle. The circulation assembly is provided with an air inlet, and an air outlet. The air inlet is used for introducing a gas to make an air pressure in the circulation assembly lower than that outside the seed suction cylinder, such that each suction nozzle can adsorb seeds, and rice awns can be sucked into the circulation assembly and then discharged through the air outlet. The sowing mechanism includes a sowing cylinder rotatably arranged on the rack. The sowing cylinder and the seed suction cylinder are arranged on one side of the seed suction cylinder and axially parallel, and an outer wall of the sowing cylinder is provided with multiple sowing troughs corresponding to the multiple suction nozzles one by one. The driving mechanism is arranged on the rack, and connected to the seed suction cylinder and the sowing cylinder. The driving mechanism is used to drive the seed suction cylinder and the sowing cylinder to rotate in the same direction clockwise or counterclockwise around axes thereof, making the suction nozzle and the sowing trough opposite to each other and have opposite movement trends, and enabling an inner wall of the sowing trough to scrape seeds on the suction nozzle into the sowing trough.

Preferably, the multiple suction nozzles are uniformly distributed on the seed suction cylinder in a circumferential direction and an axial direction, and the multiple sowing troughs are uniformly distributed on the sowing cylinder in a circumferential direction and an axial direction. The number of a row of suction nozzles distributed at intervals on the seed suction cylinder in the axial direction is the same as that of a row of sowing troughs distributed at intervals on the sowing cylinder in the axial direction.

Preferably, multiple sieve holes are formed in an outer end of each suction nozzle, and the size of the outer end of the suction nozzle is greater than that of a notch of the sowing trough.

Preferably, the circulation assembly includes multiple circulation pipes, each circulation pipe runs through the seed suction cylinder in an axial direction, and multiple joints communicating the inside are arranged on each circulation pipe in an axial direction. The multiple joints on one of the circulation pipes are in hermetical communication with a row of suction nozzles axially arranged on the seed suction cylinder. Both ends of each circulation pipe fixedly run through both ends of the seed suction cylinder, respectively, and communicate with two air guide slip rings. Each of the two air guide slip rings is provided with an air inlet, and an air outlet.

Preferably, the driving mechanism includes a driving motor, a main gear, and a first pinion and a second pinion which are meshed with the main gear. The driving motor is fixedly arranged on the rack, and the main gear is rotatably connected to the rack. The first pinion is fixedly sleeved outside a first rotating shaft, the first rotating shaft is rotatably connected to the rack, and fixedly penetrates through the seed suction cylinder in an axial direction. The second pinion is fixedly sleeved outside a second rotating shaft, and the second rotating shaft is rotatably connected to the rack, and fixedly penetrates through the sowing cylinder in an axial direction.

Preferably, the seed storage mechanism includes a support frame fixedly connected to the rack, and the support frame is arranged on one side of the seed suction mechanism, and provided with a seed feed port and a seed storage trough in communication.

Preferably, the seed storage mechanism further includes a detection component and a vibration component arranged on the rack. The detection component is arranged on one side of the seed storage trough, and the vibration component is arranged below the seed storage trough. The detection component is used to detect a seed distribution status in the seed storage trough, and the vibration component is used to vibrate the seed storage trough.

Preferably, the precision sowing device further includes a lifting mechanism arranged on the rack. The lifting mechanism is used to be connected to the transmission device and the rack, and used to adjust relative positions of the rack and the transmission device in a vertical direction.

Preferably, the precision sowing device further includes a seed protection cover arranged on the rack. The seed protection cover is arranged at one side, away from the seed suction cylinder, of the sowing cylinder with a clearance therebetween, and one side, facing the sowing cylinder, of the seed protection cover is arranged as an arc surface.

Preferably, the precision sowing device further includes a sowing slideway vertically arranged below the seed protection cover. The sowing slideway is provided with multiple vertical chutes arranged in a direction parallel to an axial direction of the sowing cylinder, and the multiple sowing troughs axially arranged on the sowing cylinder correspond to the multiple vertical chutes one by one.

Compared with the prior art, the present disclosure has the following technical effects:

The precision sowing device for rice pot seedling raising provided by the present disclosure is arranged above a transmission device through a rack, and the pots are sequentially transmitted to a lower part by the transmission device for sowing. A seed suction mechanism generates a negative pressure through a circulation assembly to suck seeds from a seed storage trough of a seed storage mechanism through a suction nozzle on a seed suction cylinder. Because the circulation assembly is provided with an air inlet and an air outlet, an air pressure in the circulation assembly is lower than that outside the seed suction cylinder after high-speed airflow is introduced into the air inlet, and the seeds can be adsorbed by the suction nozzle. Meanwhile, rice awns on the seeds can be sucked into the circulation assembly through the suction nozzle and discharged from the air outlet along with the airflow, thus avoiding accumulation and blockage, and avoiding affecting the use. In addition, a sowing cylinder on a sowing mechanism is provided with sowing troughs corresponding to the suction nozzles one by one. Under the driving of a driving mechanism, the seed suction cylinder and the sowing cylinder simultaneously rotate in the same direction clockwise or counterclockwise, such that the suction nozzle and the corresponding sowing trough have opposite movement trends when opposite to each other. In this case, the seeds on the suction nozzle enter the sowing trough, and with the further movement of the seed suction cylinder and the sowing cylinder, the seeds on the suction nozzle can be scraped into the sowing trough by an inner wall of the sowing trough. Therefore, the sowing can be achieved without controlling the flow direction of the gas in the circulation assembly, and the sowing efficiency is improved.

BRIEF DESCRIPTION OF THE DRAWINGS

To describe the technical solutions of the embodiments of the present disclosure or in the prior art more clearly, the following briefly introduces the accompanying drawings required for describing the embodiments. Apparently, the accompanying drawings in the following description show merely some embodiments of the present disclosure, and those of ordinary skill in the art may still derive other drawings from these accompanying drawings without creative efforts.

Figure 1:
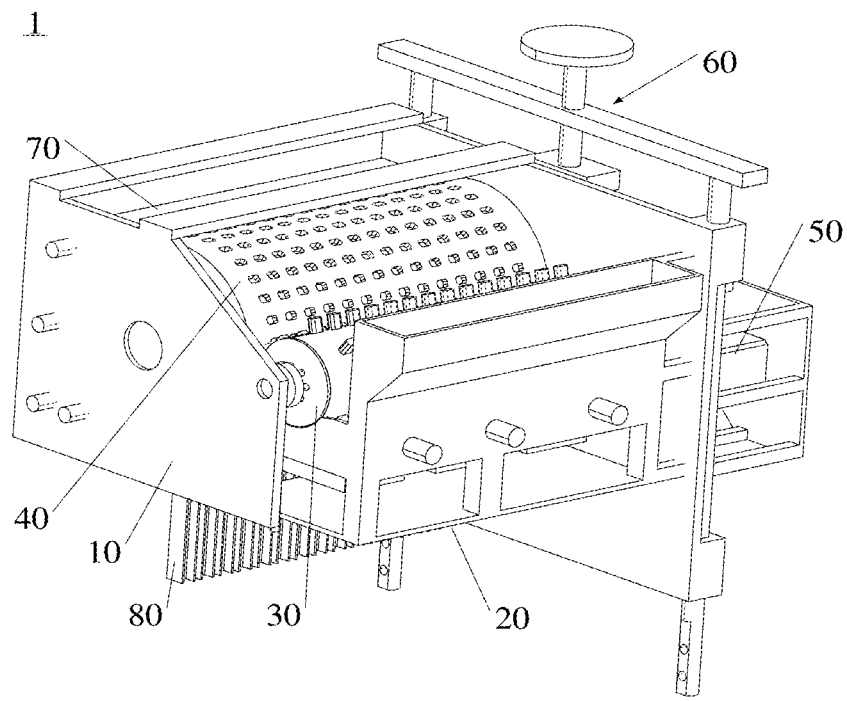
FIG. 1 is a schematic isometric view of a precision sowing device for rice pot seedling raising according to Embodiment 1.

In the drawings: 1—precision sowing device for rice pot seedling raising; 10—rack; 20—seed storage mechanism; 21—seed storage trough; 22—support frame; 23—detection component; 24—seed feed port; 25—vibration component; 30—seed suction mechanism; 31—seed suction cylinder; 32—circulation assembly; 321—circulation pipe; 322—joint; 323—air guide slip ring; 33—suction nozzle; 34—air inlet; 35—air outlet; 40—sowing mechanism; 41—sowing cylinder; 42—sowing trough; 50—driving mechanism; 51—driving motor; 52—main gear; 53—first pinion; 54—second pinion; 55—first rotating shaft; 56—second rotating shaft; 60—lifting mechanism; 61—cross rod; 62—handwheel; 63—guide rod; 64—guide block; 65—rotating shaft; 70—seed protection cover; 80—sowing slideway; 81—vertical chute.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

An objective of the present disclosure is to provide a precision sowing device for rice pot seedling raising to solve the problems in the prior art. Through the precision sowing device, the rice awns can be discharged in time to avoid blockage, and the sowing efficiency can be improved.

In order to make the objectives, features and advantages of the present disclosure more clearly, the present disclosure is further described in detail below with reference to the accompanying drawings and specific embodiments.

Embodiment 1

Figure 2:
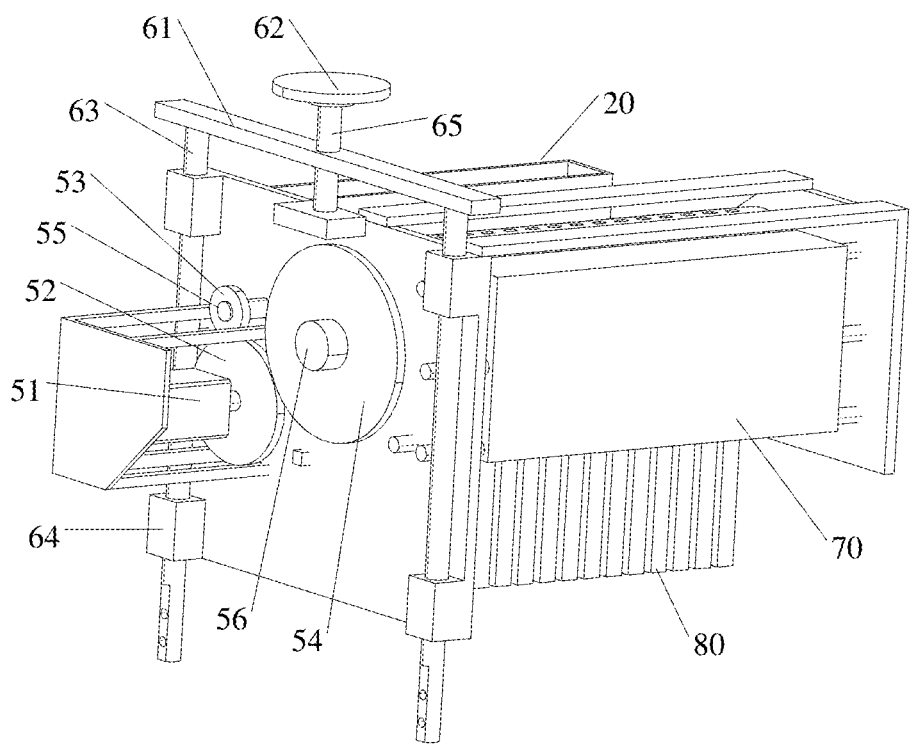
FIG. 2 is another schematic isometric view of a precision sowing device for rice pot seedling raising according to Embodiment 1.
Figure 3:
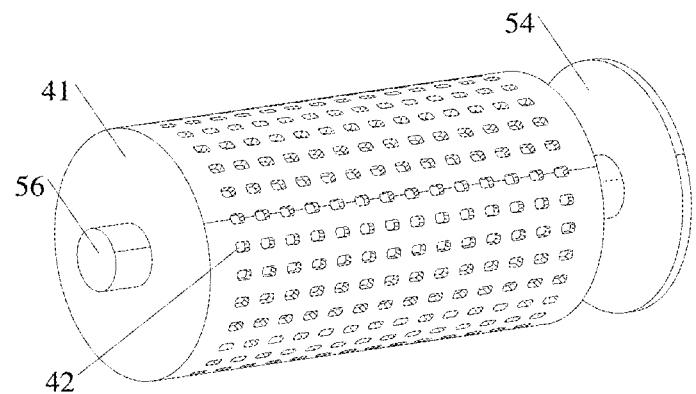
FIG. 3 is a structural diagram of a sowing mechanism according to Embodiment 1.

This embodiment provides a precision sowing device 1 for rice pot seedling raising, please referring to FIG. 1, FIG. 2, and FIG. 3. The device includes a rack 10, a seed storage mechanism 20, a seed suction mechanism 30, a sowing mechanism 40, and a driving mechanism 50. The rack 10 is used to be arranged above a transmission device. The seed storage mechanism 20 is fixedly arranged on the rack 10, and provided with a seed storage trough 21. The seed suction mechanism 30 includes a seed suction cylinder 31, and a circulation assembly 32. The seed suction cylinder 31 is rotatably connected to the rack 10, and provided with multiple suction nozzles 33 communicating with the inside. The circulation assembly 32 runs through the seed suction cylinder 31 in an axial direction and communicates with each suction nozzle 33. The circulation assembly 32 is provided with an air inlet 34, and an air outlet 35. The air inlet 34 is used for introducing a gas to make an air pressure in the circulation assembly 32 lower than that outside the seed suction cylinder 31, such that each suction nozzle 33 can adsorb seeds, and rice awns can be sucked into the circulation assembly 32 and then discharged through the air outlet 35. The sowing mechanism 40 includes a sowing cylinder 41 rotatably arranged on the rack 10. The sowing cylinder 41 and the seed suction cylinder 31 are arranged on one side of the seed suction cylinder 31 and axially parallel, and an outer wall of the sowing cylinder 41 is provided with multiple sowing troughs 42 corresponding to the multiple suction nozzles 33 one by one. The driving mechanism 50 is arranged on the rack 10, and connected to the seed suction cylinder 31 and the sowing cylinder 41. The driving mechanism 50 is used to drive the seed suction cylinder 31 and the sowing cylinder 41 to rotate in the same direction clockwise or counterclockwise around axes thereof, making the suction nozzle 33 and the sowing trough 42 opposite to each other and have opposite movement trends, and enabling an inner wall of the sowing trough 42 to scrape seeds on the suction nozzle 33 into the sowing trough 42.

The rack 10 is arranged above a transmission device, and pots are sequentially transmitted to a lower part by the transmission device for sowing. The seed suction mechanism 30 generates a negative pressure through the circulation assembly 32 to suck seeds from the seed storage trough 21 of the seed storage mechanism 20 through the suction nozzle 3 on the seed suction cylinder 31. Because the circulation assembly 32 is provided with the air inlet 34 and the air outlet 35, the air pressure in the circulation assembly 32 is lower than that outside the seed suction cylinder 31 after high-speed airflow is introduced into the air inlet 34, and the seeds can be adsorbed by the suction nozzle 3. Meanwhile, rice awns on the seeds can be sucked into the circulation assembly 32 through the suction nozzle 33 and discharged from the air outlet 35 along with the airflow, thus avoiding accumulation and blockage, and avoiding affecting the use. In addition, the sowing cylinder 41 on the sowing mechanism 40 is provided with sowing troughs 42 corresponding to the suction nozzles 33 one by one. Under the driving of the driving mechanism 50, the seed suction cylinder 31 and the sowing cylinder 41 simultaneously rotate in the same direction clockwise or counterclockwise, such that the suction nozzle 33 and the corresponding sowing trough 42 have opposite movement trends when opposite to each other. In this case, the seeds on the suction nozzle 33 enter the sowing trough 42, and with the further movement of the seed suction cylinder 32 and the sowing cylinder 41, the seeds on the suction nozzle 33 can be scraped into the sowing trough 42 by the inner wall of the sowing trough 42. Therefore, the sowing can be achieved without controlling the flow direction of the gas in the circulation assembly 32, and the sowing efficiency is improved.

Specifically, please referring to FIG. 1, from the non-driving mechanism 50 side, the seed suction cylinder 31 and the sowing cylinder 41 both rotate counterclockwise, the seeds are continuously fed into the sowing trough 42 in the sowing cylinder 41 by the seed suction cylinder 31. The seed suction cylinder 31 and the sowing cylinder 41 can be arranged side by side with the same axis height, thus preventing the seeds from falling into the sowing trough 42.

Figure 4:
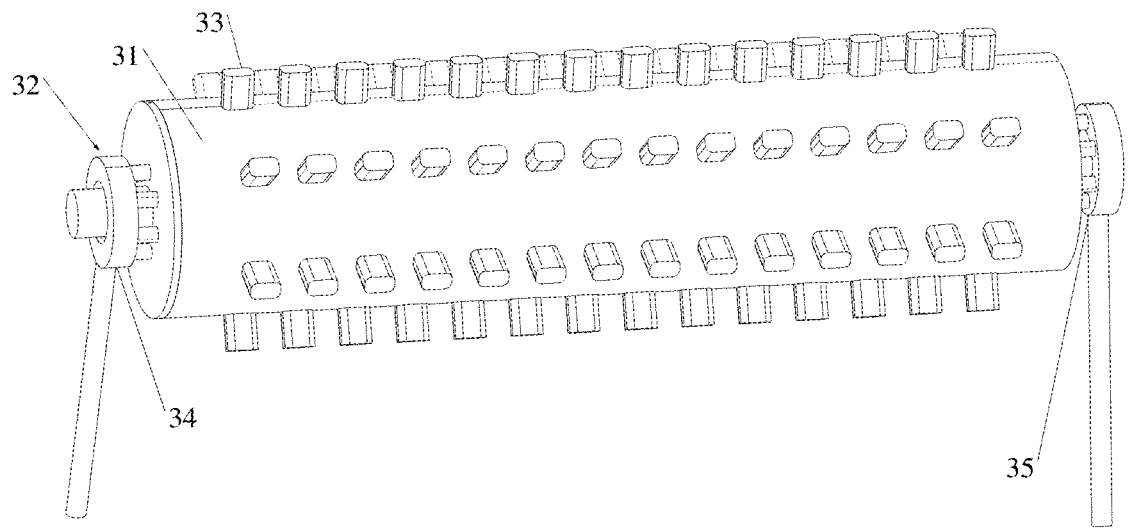
FIG. 4 is a structural diagram of a seed suction mechanism according to Embodiment 1.

In an alternative scheme of this embodiment, preferably, please referring to FIG. 4, the multiple suction nozzles 33 are uniformly distributed on the seed suction cylinder 31 in a circumferential direction and an axial direction, and the multiple sowing troughs 42 are uniformly distributed on the sowing cylinder 41 in a circumferential direction and an axial direction. The number of a row of suction nozzles 33 distributed at intervals on the seed suction cylinder 31 in the axial direction is the same as that of a row of sowing troughs 42 distributed at intervals on the sowing cylinder 41 in the axial direction. The seed suction efficiency and sowing efficiency can be improved by providing multiple suction nozzles 33 and multiple sowing troughs 42.

In an alternative scheme of this embodiment, preferably, multiple sieve holes are formed in an outer end of each suction nozzle 33, an aperture of the sieve hole is determined according to actual situation for the rice awns to pass through but not seeds. By controlling the size of the outer end of the suction nozzle 33, two to three seeds can be adsorbed to achieve precision sowing. The size of the outer end of the suction nozzle 33 is greater than that of a notch of the sowing trough 42. Specifically, the outer end of the suction nozzle 33 may be set as an arc shape, and the size of the outer end of the suction nozzle 33 is slightly greater than that of the notch of the sowing trough 42, such that the seeds can enter the sowing trough 42 and can be scraped off.

Figure 5:
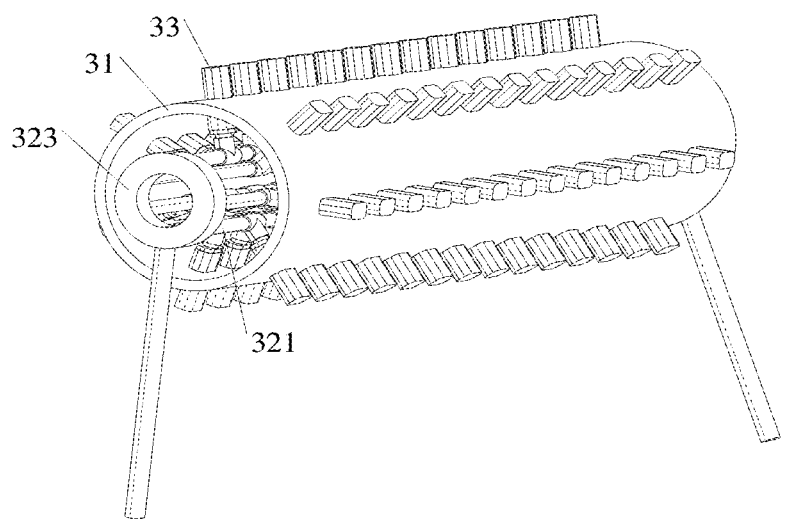
FIG. 5 is a structural diagram of a seed suction mechanism (with an opening on one side) according to Embodiment 1.
Figure 6:
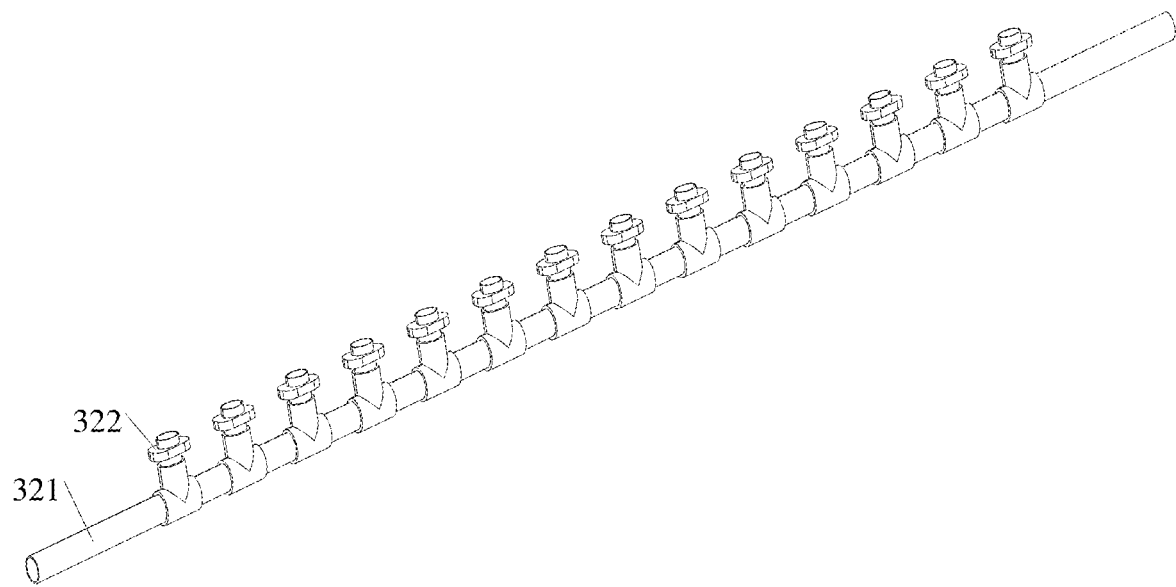
FIG. 6 is a structural diagram of a circulation pipe according to Embodiment 1.

In an alternative scheme of this embodiment, preferably, please referring to FIG. 5 and FIG. 6, the circulation assembly 32 includes circulation pipes 321. Each circulation pipe 321 runs through the seed suction cylinder 31 in an axial direction, and multiple joints 322 communicating the inside are arranged on each circulation pipe 321 in an axial direction. The multiple joints 322 on one of the circulation pipes 321 are in hermetical communication with a row of suction nozzles 33 axially arranged on the seed suction cylinder 31 to guarantee the pressure by sealing connection. Multiple circulation pipes 321 are provided to communicate with multiple rows of suction nozzles 33, respectively. Both ends of each circulation pipe 321 fixedly run through both ends of the seed suction cylinder 31, respectively, and communicate with two air guide slip rings 323. Each of the two air guide slip rings 323 is provided with an air inlet 34, and an air outlet 35. Meanwhile, by using an own structure of the air guide slip ring 323, the rotation of the whole seed suction cylinder 31 and multiple circulation pipes 321 can be not affected while the gas circulates.

In an alternative scheme of this embodiment, preferably, referring to FIG. 2, the driving mechanism 50 includes a driving motor 51, a main gear 52, and a first pinion 53 and a second pinion 54 which are meshed with the main gear 52. The driving motor 51 is fixedly arranged on the rack 10, and the main gear 52 is rotatably connected to the rack 10. The first pinion 53 is fixedly sleeved outside a first rotating shaft 55, the first rotating shaft 55 is rotatably connected to the rack 10, and fixedly penetrates through the seed suction cylinder 31 in an axial direction. The second pinion 54 is fixedly sleeved outside a second rotating shaft 56, and the second rotating shaft 56 is rotatably connected to the rack 10, and fixedly penetrates through the sowing cylinder 41 in an axial direction. Through the engagement between the main gear 52 and the first pinion 53 and the second pinion 54, under the driving of the driving motor 51, the seed suction cylinder 31 and the sowing cylinder 41 can rotate synchronously, thus achieving precision sowing.

Figure 8:
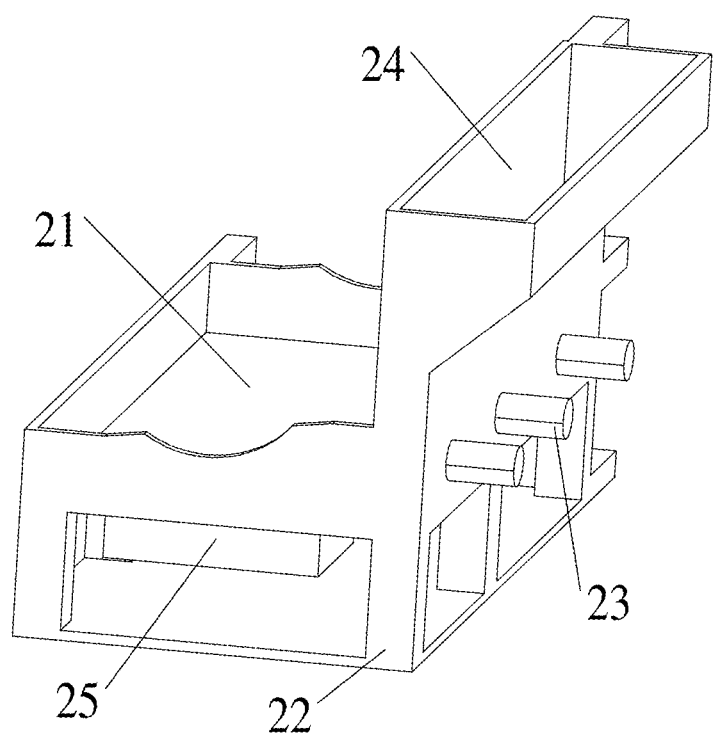
FIG. 8 is a structural diagram of a seed storage mechanism according to Embodiment 1.

In an alternative scheme of this embodiment, preferably, referring to FIG. 8, the seed storage mechanism 20 includes a support frame 22 fixedly connected to the rack 10, and the support frame 22 is arranged on one side of the seed suction mechanism 30, and provided with a seed feed port 24 and a seed storage trough 21 in communication. The seeds are fed into the seed storage groove 21 through the seed inlet 24.

In an alternative scheme of this embodiment, preferably, the seed storage mechanism 20 further includes a detection component 23 and a vibration component 25 arranged on the rack 10. The detection component 23 is arranged on one side of the seed storage groove 21, and the vibration component 25 is arranged below the seed storage trough 21. The detection component 23 is used to detect a seed distribution status in the seed storage trough 21, and the vibration component 25 is used to vibrate the seed storage trough 21. Specifically, the detection component 23 may be multiple infrared monitors, or the seed distribution condition in the seed storage trough 21 is acquired using a camera. A controller, after acquiring information of the detection component 23, determines whether the seed distribution in the seed storage groove 21 is uniform or not. If the seed distribution in the seed storage groove 21 is non-uniform, the vibration component 25 can be controlled to vibrate to shake the seeds in the seed storage groove 21 uniformly. The vibration component 25 may be a vibration motor.

In an alternative scheme of this embodiment, preferably, referring to FIG. 2, the precision sowing device for rice pot seedling raising further includes a lifting mechanism 60 arranged on the rack 10. The lifting mechanism 60 is used to be connected to the transmission device and the rack 10, and used to adjust a relative position of the rack 10 in a vertical direction of the transmission device, thus adapting to pots at different heights.

Specifically, the lifting mechanism 60 includes a cross rod 61, a handwheel 62, and two guide rods 63. The two guide rods 63 are vertically arranged on two vertical ends of one side surface of the rack 10 side by side, and the side surface of the rack 10 is provided with multiple guide blocks 64 for the two guide rods 63 to penetrate through slidingly. Lower ends of the two guide rods 63 are fixedly connected to the transmission device, and upper ends of the two guide rods 63 are fixedly connected to both ends of the cross rod 61, respectively. The handwheel 62 is rotatably connected to the rack 10 by the rotating shaft 65 and vertically fixed at a relative position. The rotating shaft 65 penetrates through the middle of the cross rod 61 in a threaded manner. Specifically, a lower end of the rotating shaft 65 is rotatably connected to the rack 10 by a bearing, when the handwheel 62 rotates relative to the cross rod 61, the rotation of the handwheel 62 is transformed into the vertical movement of the whole rack 10 under the guidance of the two guide rods 63, thus adjusting the vertical position. In addition, the lifting mechanism 60 may further be a lifting motor, or a hydraulic telescopic mechanism, and thus the lifting of the rack 10 can be achieved.

Figure 7:
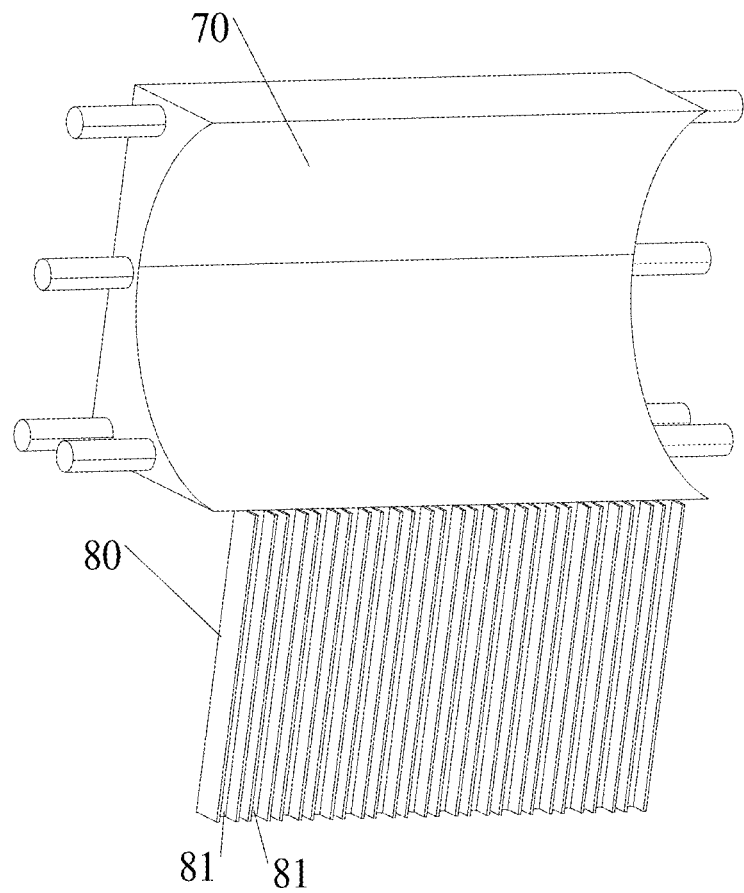
FIG. 7 is a structural diagram of a seed protection cover according to Embodiment 1.

In an alternative scheme of this embodiment, preferably, referring to FIG. 7, the precision sowing device 1 for rice pot seedling raising further includes a seed protection cover 70 arranged on the rack 10. The seed protection cover 70 is arranged at one side, away from the seed suction cylinder 31, of the sowing cylinder 41 with a clearance therebetween, and one side, facing the sowing cylinder 41, of the seed protection cover 70 is arranged as an arc surface. Specifically, a clearance of 2 mm may be arranged between the seed protection cover 70 and the sowing cylinder 41, thus preventing the seeds in the sowing trough 42 from falling off.

In an alternative scheme of this embodiment, preferably, the precision sowing device 1 for rice pot seedling raising further includes a sowing slideway 80 vertically arranged below the seed protection cover 70. The sowing slideway 80 is provided with a plurality of vertical chutes 81 arranged in a direction parallel to an axial direction of the sowing cylinder 41, and the multiple sowing troughs 42 axially arranged on the sowing cylinder 41 correspond to the multiple vertical chutes 81 one by one. When the sowing trough 42 with the seeds is rotated to the lower end of the seed protection cover 70, the seeds can slide down into the pot under the guidance of the vertical chute 81.

Specific examples are used herein for illustration of the principles and embodiments of the present disclosure. The description of the embodiments is merely used to help illustrate the method and its core principles of the present disclosure. In addition, those of ordinary skill in the art can make various modifications in terms of specific embodiments and scope of application in accordance with the teachings of the present disclosure. In conclusion, the content of this specification shall not be construed as a limitation to the present disclosure.

What is claimed is:

1. A precision sowing device for rice pot seedling raising, comprising:
   a rack used to be arranged above a transmission device;
   a seed storage mechanism, fixedly arranged on the rack, wherein the seed storage mechanism is provided with a seed storage trough;
   a seed suction mechanism, comprising a seed suction cylinder, and a circulation assembly, wherein the seed suction cylinder is rotatably connected to the rack, and provided with a plurality of suction nozzles communicating with an inside of the seed suction cylinder, the circulation assembly runs through the seed suction cylinder in an axial direction and communicates with each suction nozzle, the circulation assembly is provided with an air inlet and an air outlet, the air inlet is used for introducing a gas to make an air pressure in the circulation assembly lower than that outside the seed suction cylinder, such that each suction nozzle is able to adsorb seeds, and rice awns are able to be sucked into the circulation assembly and then discharged through the air outlet;
   a sowing mechanism, comprising a sowing cylinder rotatably arranged on the rack, wherein the sowing cylinder is arranged on one side of the seed suction cylinder and axially parallel, and an outer wall of the sowing cylinder is provided with a plurality of sowing troughs, and the sowing troughs are in a one-to-one correspondence to the plurality of suction nozzles; and
   a driving mechanism, arranged on the rack, and connected to the seed suction cylinder and the sowing cylinder, wherein the driving mechanism is used to drive the seed suction cylinder and the sowing cylinder to rotate in the same direction clockwise or counterclockwise around axes thereof, enabling an inner wall of the sowing trough to scrape seeds on the suction nozzle into the sowing trough.

2. The precision sowing device for rice pot seedling raising according to claim 1, wherein the plurality of suction nozzles are uniformly distributed on the seed suction cylinder in a circumferential direction and an axial direction, and the plurality of sowing troughs are uniformly distributed on the sowing cylinder in a circumferential direction and an axial direction; and the number of a row of suction nozzles distributed at intervals on the seed suction cylinder in the axial direction is the same as that of a row of sowing troughs distributed at intervals on the sowing cylinder in the axial direction.

3. The precision sowing device for rice pot seedling raising according to claim 2, wherein the size of the outer end of the suction nozzle is greater than that of the sowing trough.

4. The precision sowing device for rice pot seedling raising according to claim 2, wherein the circulation assembly comprises a plurality of circulation pipes, each circulation pipe runs through the seed suction cylinder in an axial direction, and a plurality of joints communicating with an inside of the circulation pipe are arranged on each circulation pipe in an axial direction; the plurality of joints on one of the circulation pipes are in hermetical communication with a row of suction nozzles axially arranged on the seed suction cylinder; both ends of each circulation pipe fixedly run through both ends of the seed suction cylinder, respectively, and communicate with two air guide slip rings; and each of the two air guide slip rings is provided with an air inlet and an air outlet.

5. The precision sowing device for rice pot seedling raising according to claim 1, wherein the driving mechanism comprises a driving motor, a main gear, and a first pinion and a second pinion which are meshed with the main gear; the driving motor is fixedly arranged on the rack, and the main gear is rotatably connected to the rack; the first pinion is fixedly sleeved outside a first rotating shaft, the first rotating shaft is rotatably connected to the rack, and fixedly penetrates through the seed suction cylinder in an axial direction; the second pinion is fixedly sleeved outside a second rotating shaft, and the second rotating shaft is rotatably connected to the rack, and fixedly penetrates through the sowing cylinder in an axial direction.

6. The precision sowing device for rice pot seedling raising according to claim 1, wherein the seed storage mechanism comprises a support frame fixedly connected to the rack, and the support frame is arranged on one side of the seed suction mechanism, and provided with a seed feed port and a seed storage trough in communication.

7. The precision sowing device for rice pot seedling raising according to claim 6, wherein the seed storage mechanism further comprises a detection component and a vibration component arranged on the rack; the detection component is arranged on one side of the seed storage trough, comprising multiple infrared monitors or a camera for detecting a seed distribution status in the seed storage trough; and the vibration component is arranged below the seed storage trough, comprising a vibration motor for vibrating the seed storage trough.

8. The precision sowing device for rice pot seedling raising according to claim 1, further comprising a lifting mechanism arranged on the rack, wherein the lifting mechanism is used to be connected to the transmission device and the rack, and used to adjust relative positions of the rack and the transmission device in a vertical direction.

9. The precision sowing device for rice pot seedling raising according to claim 1, further comprising a seed protection cover arranged on the rack, wherein the seed protection cover is arranged at one side, away from the seed suction cylinder, of the sowing cylinder with a clearance therebetween, and one side, facing the sowing cylinder, of the seed protection cover is arranged as an arc surface.

10. The precision sowing device for rice pot seedling raising according to claim 9, further comprising a sowing slideway vertically arranged below the seed protection cover, wherein the sowing slideway is provided with a plurality of vertical chutes arranged in a direction parallel to an axial direction of the sowing cylinder, and the plurality of sowing troughs axially arranged on the sowing cylinder are in a one-to-one correspondence to the plurality of vertical chutes.

* * * * *